United States Patent
Kim et al.

(10) Patent No.: US 9,578,136 B2
(45) Date of Patent: Feb. 21, 2017

(54) DISTRIBUTED TRANSCODING APPARATUS AND METHOD USING MULTIPLE SERVERS

(71) Applicants: Samsung Electronics Co., Ltd, Gyeonggi-do (KR); Industry-Academic Cooperation Foundation, Yonsei University, Seoul (KR)

(72) Inventors: Jae-Ho Kim, Seoul (KR); Sun-Mi Kim, Seoul (KR); Won Woo Ro, Seoul (KR); Keunsoo Kim, Seoul (KR); Seung Hun Kim, Seoul (KR); Jin-Won Kim, Seoul (KR); Kijoon Chang, Seoul (KR)

(73) Assignee: Industry-Academic Cooperation Foundation Yonsei University, Seoul (KR)

( * ) Notice: Subject to any disclaimer, the term of this patent is extended or adjusted under 35 U.S.C. 154(b) by 488 days.

(21) Appl. No.: 13/849,033

(22) Filed: Mar. 22, 2013

(65) Prior Publication Data
US 2013/0297679 A1    Nov. 7, 2013

(30) Foreign Application Priority Data
May 2, 2012    (KR) .................. 10-2012-0046355

(51) Int. Cl.
*G06F 15/16* (2006.01)
*H04L 29/06* (2006.01)
(Continued)

(52) U.S. Cl.
CPC ............ *H04L 67/42* (2013.01); *H04N 21/222* (2013.01); *H04N 21/2343* (2013.01); *H04N 21/2405* (2013.01)

(58) Field of Classification Search
CPC ... H04L 67/42; H04N 21/222; H04N 21/2343; H04N 21/2405
See application file for complete search history.

(56) References Cited

U.S. PATENT DOCUMENTS 7,809,830 B2 * 10/2010 Denoual .................. 709/226
8,656,442 B1 *  2/2014 Clarke ............... H04L 65/605
                                                          709/203
(Continued)

FOREIGN PATENT DOCUMENTS

JP    2006-155602    6/2006
KR    10-2011-0059428    6/2011

OTHER PUBLICATIONS

International Search Report dated Jul. 25, 2013 in connection with International Patent Application No. PCT/KR2013/002028, 3 pages.
(Continued)

*Primary Examiner* — Mohamed Wasel

(57) ABSTRACT

An embodiment provides a distributed transcoding method using a plurality of servers. The method includes receiving a request for a first video file from a first terminal. The method also includes segmenting the video file based on a play time of at least portion of the video file and a performance rate of a plurality of second servers. The method also includes transmitting the segmented video file to the plurality of second servers, which includes transmitting the segmented video file of a greater size to the second server having a higher performance among the plurality of second servers and transmitting the segmented video file having a smaller size to the server having a lower performance among the plurality of second servers. The method also includes receiving a transcoded video file from the plurality of second servers. The method also includes transmitting the transcoded video files to the first terminal.

14 Claims, 9 Drawing Sheets

(51) Int. Cl.
*H04N 21/2343* (2011.01)
*H04N 21/222* (2011.01)
*H04N 21/24* (2011.01)

(56) References Cited

U.S. PATENT DOCUMENTS

| | | |
|---|---|---|
| 2006/0168323 A1 | 7/2006 | Kim et al. |
| 2006/0294183 A1 | 12/2006 | Agnoli et al. |
| 2009/0119322 A1* | 5/2009 | Mills ................. G06F 17/30017 |
| 2009/0178088 A1* | 7/2009 | Liu .................... H04N 7/17336 |
| | | 725/87 |
| 2010/0077438 A1* | 3/2010 | Ansari ............................ 725/91 |
| 2010/0115575 A1* | 5/2010 | Yu et al. ....................... 725/142 |
| 2011/0200094 A1 | 8/2011 | Kalra et al. |
| 2011/0265134 A1 | 10/2011 | Jaggi et al. |
| 2011/0274155 A1 | 11/2011 | Noh et al. |
| 2012/0079527 A1 | 3/2012 | Trimper et al. |
| 2013/0114744 A1* | 5/2013 | Mutton .................... 375/240.26 |
| 2015/0237102 A1* | 8/2015 | Baccichet ............. H04L 65/605 |
| | | 709/204 |

OTHER PUBLICATIONS

Written Opinion of the International Searching Authority dated Jul. 25, 2013 in connection with International Patent Application No. PCT/KR2013/002028, 7 pages.

* cited by examiner

DISTRIBUTED TRANSCODING APPARATUS AND METHOD USING MULTIPLE SERVERS

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on May 2, 2012, and assigned Serial No. 10-2012-0046355, the entire disclosure of which is hereby incorporated by reference.

TECHNICAL FIELD OF THE INVENTION

The present invention relates generally to transcoding techniques, and more particularly, to a distributed transcoding apparatus and method using multiple servers.

BACKGROUND OF THE INVENTION

As network technologies advance, clients can send and store various types of content to a server, and receive and display the content stored to the server at his/her discretion. However, to transmit the content from the server to the client, the content stored on the server should be the same as a format as that used by the client. That is, when the stored content is different from the format of the client who requests the content, the server needs to transcode the content to a format used by the client. Accordingly, when the server is requested by a plurality of clients to transmit its stored content during one transcoding operation, the server often needs to perform a plurality of transcoding operations.

However, since most servers mostly use low-end processors, it may be hard to exhibit proper performance for the plurality of the transcoding operations. That is, it may be difficult to successfully transmit particular types of content requested by the multiple clients. Thus, what is needed is a method for performing the plurality of the transcoding operations in servers that may use a low-level processor.

SUMMARY OF THE INVENTION

To address the above-discussed deficiencies of the prior art, it is a primary aspect of the present invention to provide an apparatus and a method for performing transcoding with a plurality of offloaded servers.

Another aspect of the present invention is to provide an apparatus and a method for distributing and requesting transcoding to multiple offloading servers according to their performance by monitoring transcoding performance of the offloading servers.

Yet another aspect of the present invention is to provide an apparatus and a method for saving power used by multiple offloading servers by activating the offloading server only when it performs transcoding and switching the offloading server to a low-power mode when it does not perform the transcoding According to one aspect of the present invention, an operating method of a first server includes receiving a request for a first video file from a first terminal; distributing and requesting a first transcoding of the first video file to at least two second servers according to performance rates of the second servers, before receiving the first video file with the completed first transcoding from the second server, receiving a request for a second video file from a second terminal, and distributing and requesting, second transcoding of the second video file to the second servers according to the performance rates of the second servers.

The distributing and requesting of the second transcoding of the second video file to the second servers according to the performance rates of the second servers may include requesting the second transcoding of the second video file having a relatively greater size from the server of a relatively higher performance among the second servers, and requesting the second transcoding of the second video file having a relatively smaller size from the server having a relatively lower performance.

The distributing and requesting of the second transcoding of the second video file to the second servers according to the performance rates of the second servers may include requesting the second transcoding of the second video file from the server having a highest performance among the second servers.

The operating method may further include sending a wakeup signal to the at least two second servers; and receiving an ACKnowledge (ACK) signal from the second server.

The distributing and requesting of the first transcoding of the first video file to the at least two second servers according to the performance rates of the second servers may include segmenting the first video file based on the performance rates of the second servers, and transmitting the segmented first video files to the second servers to match the performance rates of the second servers.

The distributing and requesting of the first transcoding of the first video file to the at least two second servers according to the performance rates of the second servers may include segmenting the first video file to a first region file and a second region file, transmitting the first region file to the server of the highest performance among the second servers, segmenting the second region file according to the performance rates of other servers excluding the server having the highest performance among the second servers, and transmitting the segmented second region files to the other servers to match the performance rates of the other servers.

The receiving of the request for the second video file from the second terminal may include confirming information associated with the requested second video file, and confirming that a format of the requested second video file is different from a format of a stored video file.

The second terminal may include at least one terminal.

The distributing and requesting of the second transcoding of the second video file to the second servers according to the performance rates of the second servers may include segmenting the second video file based on the performance rates of the second servers, and transmitting the segmented second video files to the second servers to match the performance rates of the second servers.

The distributing and requesting of the second transcoding of the second video file to the second servers according to the performance rates of the second servers may include segmenting the second video file to a first region file and a second region file, transmitting the first region file to the server having the highest performance among the second servers, segmenting the second region file according to the performance rates of other servers excluding the server having the highest performance among the second servers, and transmitting the segmented second region files to the other servers to match the performance rates of the other servers.

The first region file may be a file region, in the first video file or the second video file, which needs to be played immediately by the first terminal and the second terminal.

The performance may include a transcoding performance.

The operating method may include receiving the video files with the first transcoding and the second transcoding completed from the second servers, and transmitting the video files with the first transcoding and the completed second transcoding to the first terminal and the second terminal respectively.

According to another aspect of the present invention, an operating method of at least two second servers includes receiving a request for a first transcoding of at least one segmented video file from a first server, receiving a request for second transcoding of at least one segmented video file from the first server during the first transcoding, and performing the first transcoding and the second transcoding.

The operating method may further include transmitting performance information to the first server at specified time intervals.

The operating method may further include receiving a wakeup signal from the first server, sending an ACKnowledge (ACK) signal to the first server, and switching from a low-power state to an active state.

The operating method may further include completing the first transcoding and the second transcoding, transmitting the transcoded video file to the first server, and switching from an active state to a low-power state.

According to yet another aspect of the present invention, a first server includes a communication module configured to receive a request for a first video file from a first terminal, distribute and request a first transcoding of the first video file to at least two second servers according to performance rates of the second servers, receiving a request for a second video file from a second terminal before receiving the first video file with the completed first transcoding from the second server, and distribute and request second transcoding of the second video file to the second servers according to the performance rates of the second servers, and a controller configured to control operations of the first server.

The communication module may request the second transcoding of the second video file having a relatively greater size from the server having a relatively higher performance among the second servers, and request the second transcoding of the second video file having a relatively smaller size from the server having a relatively lower performance.

The communication module may request the second transcoding of the second video file from the server having a highest performance among the second servers.

The communication module may send a wakeup signal to the at least two second servers, and receive an ACK signal from the second server.

The controller may segment the first video file based on the performance rates of the second servers for the first transcoding, and the communication module may transmit the segmented first video files to the second servers to match the performance rates of the second servers.

The controller may segment the first video file to a first region file and a second region file for the first transcoding and segment the second region file according to the performance rates of other servers excluding the server having the highest performance among the second servers, and the communication module may transmit the first region file to the server having the highest performance among the second servers and transmit the segmented second region files to the other servers to match the performance rates of the other servers.

The controller may confirm information associated with the second video file requested by the second terminal and confirm that a format of the requested second video file is different from a format of a video file stored.

The second terminal may include at least one terminal.

The controller may segment the second video file based on the performance rates of the second servers for the second transcoding, and the communication module may transmit the segmented second video files to the second servers to match the performance rates of the second servers.

The controller may segment the second video file into a first region file and a second region file for the second transcoding and segment the second region file according to the performance rates of other servers excluding the server having the highest performance among the second servers, and the communication module may transmit the first region file to the server having the highest performance among the second servers and transmit the segmented second region files to the other servers to match the performance rates of the other servers.

The first region file may be a file region, in the video file, which needs to be played immediately by the first terminal and the second terminal.

The performance may include a transcoding performance.

The communication module may receive the video files with the first transcoding and the completed second transcoding from the second servers, and transmit the video files with the first transcoding and the completed second transcoding to the first terminal and the second terminal respectively.

According to still another aspect of the present invention, at least two second servers includes a communication module configured to receive a request for a first transcoding of at least one segmented video file from a first server, and receiving a request for a second transcoding of at least one segmented video file from the first server during the first transcoding; and a controller configured to perform the first transcoding and the second transcoding.

The communication module may transmit performance information to the first server at specified time intervals.

The communication module may receive a wakeup signal from the first server and sends an ACK signal to the first server, and the controller may switch from a low-power state to an active state.

The controller may complete the first transcoding and the second transcoding and switch from an active state to a low-power state, and the communication module may transmit the transcoded video file to the first server.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network devices. The following description with reference to the accompanying drawings is provided to assist in a comprehensive understanding of embodiments of the invention as defined by the claims and their equivalents. It includes various specific details to assist in that understanding but these are to be regarded as merely exemplary. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the tem "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
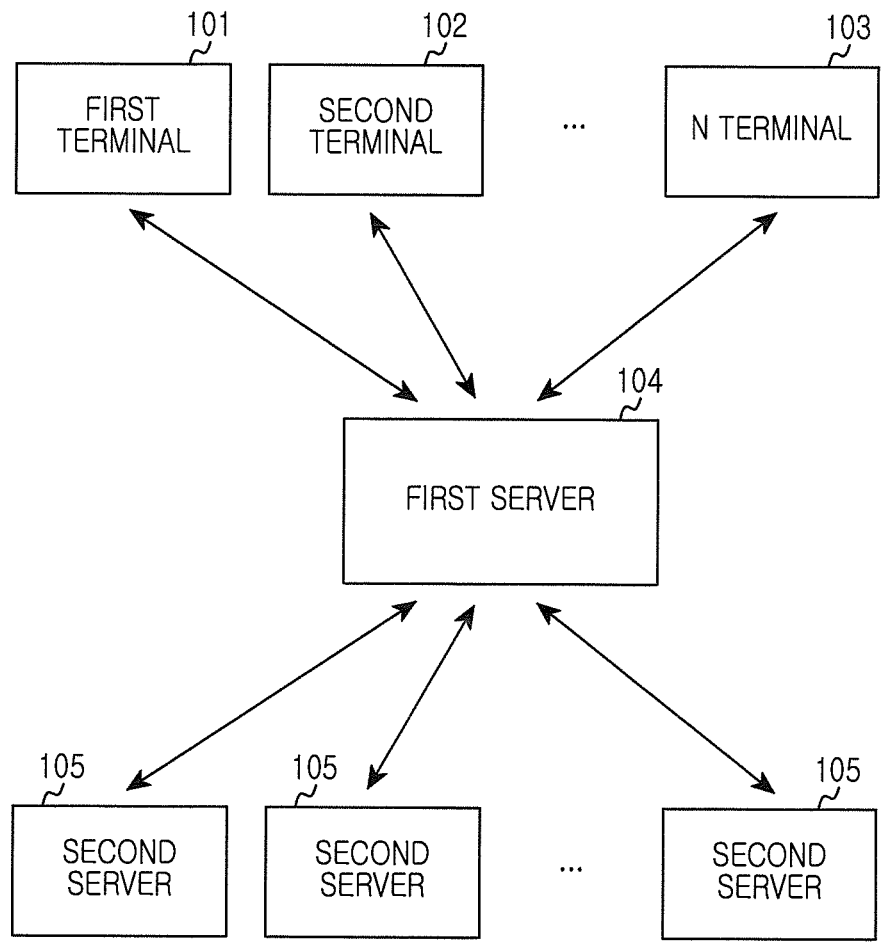
FIG. 1 illustrates an example configuration according to an embodiment of the present invention.

FIG. 1 illustrates an example configuration according to an embodiment of the present invention. As shown in FIG. 1, for a distributed transcoding apparatus using multiple servers, relationships between at least two terminals 101, 102 and 103, a first server 104, and at least two second servers 105 will be described. That is, the terminals 101, 102 and 103 are coupled to the first server 104, and the first server 104 is coupled to the at least two second servers 105.

The terminals 101, 102 and 103 can store a particular video file in the first server 104 and receive the stored video file from the server 104. Herein, it is assumed that at least two terminals request at least one video file from the first server 104 and receive the requested video file from the first server 104. In more detail, the present invention provides a technique that allows at least two terminals to request at least one video file from the first server at certain time intervals and to receive their requested video file. For example, it is assumed that the first terminal 101 requests at least one video file from the first server 104 and then receives the requested video file from the server 104. Next, when the second terminal 102 requests at least one video file from the first server 104, the video files requested by the first terminal 101 and the second terminal 102 can be successfully received from the first server 104. When multiple terminals requests video files that require transcoding from the server, known devices often cannot provide sufficient performance for performing the transcoding because these servers mostly use low-end processors. Hence, when several terminals request the video files requiring the transcoding from the server at the same time, every terminal rarely receives the corresponding video file from the server. However, as discussed above, even when the terminals 101, 102 and 103 request their necessary video file which requires the transcoding from the first server 104, every terminal can successfully receive the corresponding video file from the first server 104.

The first server 104 receives the request for the at least one video file requiring the transcoding, from the terminals 101, 102 and 103, and distributes and requests the transcoding to the at least two second servers 105. Specifically, the first server 104 distributes and requests the transcoding to the at least two second servers 105 coupled with itself according to their transcoding performance, rather than performing the transcoding by itself. Herein, the transcoding changes a format of the video file stored in the first server 104 to a another format requested by the terminal. For example, the transcoding may change a codec type, a screen size, and a bit rate as requested by the corresponding terminal. Hereinafter, how the first terminal 101 and the second terminal 102 request particular video files from the first server 104 and the first server 104 requests the transcoding from the second server 105 is described in detail herein.

First, the first server 104 receives transcoding performance information from each of the second servers 105 at specified time intervals. Next, the first server 104 monitors the transcoding performance information received from the second severs 105, and converts to relative rates in a descending order of the performance based on the highest-performance server of the second servers 105. For example, provided that the first server 104 is coupled to three second servers 105, the first server 104 arranges the three second servers 105 in their order of transcoding performance. Based on the highest-performance server, the first server 104 converts the performance of the two remaining servers to their relative performance rates. That is, the rate of performance is converted by setting the highest-performance server to a value, such as 100. When the highest-performance server is set to 100, the server of the next highest performance can be converted to the rate of a lower value, such as 70 and the server of the lowest performance can be converted to the rate of an even lower value, such as 30. Next, when the first server 104 receives the request for the at least one video file from the first terminal 104, it checks information associated with the requested video file from the first terminal 101. Herein, the information associated with the video file indicates the format of the video file and can include, for example, the codec type, the screen size, and the bit rate. That is, the first server 104 checks the information associated with the video file requested from the first terminal 101 in order to determine whether the first terminal 101 can play the transmitted video file when the corresponding video file stored in the first server 104 is transmitted to the first terminal 101 as it is. When the format of the video file stored in the first server 104 is different from the format of the first terminal 101, the first server 104 transcodes the video file prior to sending the corresponding video file to the first terminal 101.

The first server 104 distributes and requests transcoding to the second servers 105 coupled to the first server 104, rather than performing the transcoding by itself. In this embodiment, the first server 104 segments a particular video file requested by the first terminal 101 into multiple parts, such as, for example, three parts. That is, assuming that the size of the video file is 100, the first server 104 segments the file into size rates of 50%, 35%, and 15% by considering the transcoding performance of the three second severs 105. The first server 104 segments the video file into the three parts requests the transcoding of the segmented files from the three second servers 105 to match their performance. In this embodiment, the first server 104 requests the transcoding by sending the file of the size that is 50%, among the three segmented video files, to the second server having the highest performance, requests the transcoding by sending the file of the size that is 35% to the next highest second server, and requests the transcoding by sending the file of the size that is 15% to the second server having the lowest performance. Hence, even when a plurality of the terminals requests at least one video file before the transcoding is completed, the first server 104 can successfully transmit the corresponding video file to the terminals. Next, the first server 104 receives the transcoded video file from the second server 105 and forwards the corresponding video file to the requested terminal. Thus, the first server 104 can efficiently transmit the video file requested by the terminal by monitoring the transcoding performance of the second server 105, without having to conduct the transcoding autonomously. Alternatively, the first server 104 requests transcoding by sending the file of the size that is 50%, among the three segmented video files, to the second server having the highest performance, requests the transcoding by sending the file of the size that is 35% to the next highest second server, and requests the transcoding by sending the file of the size that is 15% to the second server having the lowest performance. Next, the first server 104 first receives the transcoded video file of the size that is 50% from the second server 105 having the highest performance, and forwards the corresponding file to the first terminal 101. That is, the first server 104 sends the file which is transcoded first of all in the whole video file, to the first terminal 101, and sends the other untranscoded files to the first terminal 101 immediately when receiving them from the servers having the next highest performance and the lowest performance. Hence, when requesting a particular video file from the first server 104, the first terminal 101 can play the corresponding video file immediately without time delay and allow real-time streaming for playing the corresponding file even before the entire video file is downloaded. Likewise, the first server 104 requests the second server having the highest performance to transcode the part to play immediately in the entire video file requested by the terminal, and first transmits the transcoded file to the terminal. That is, the first server 104 requests the server having the highest performance among the second servers, to transcode the part to play immediately in the whole video file requested by the terminal, and requests the server having the lower performance to transcode the part which does not need to be immediately played by the terminal, thus achieving efficient distributed transcoding in some embodiments.

The first server 104 requests the transcoding from the at least two second servers 105, and the second servers 105 perform the transcoding by proxy. In more detail, the first server 104 requests the proxy transcoding from the second server 105 according to a transcoding performance of the second servers. Next, upon completing, the transcoding of the video file received from the first server 104, the second server 105 transmits the transcoded video file to the first server 104. While the multiple conventional servers functioning as the second servers of the present invention proxies the transcoding, the conventional method does not take into account the transcoding performance of the server which proxies the transcoding as performed in embodiments of the present invention. That is, conventional methods perform the monolithic proxy transcoding and thus do not reflect the actual communication environment. However, the present invention considers the transcoding performance of the second servers 105 and thus can effectively distribute the transcoding.

Figure 2:
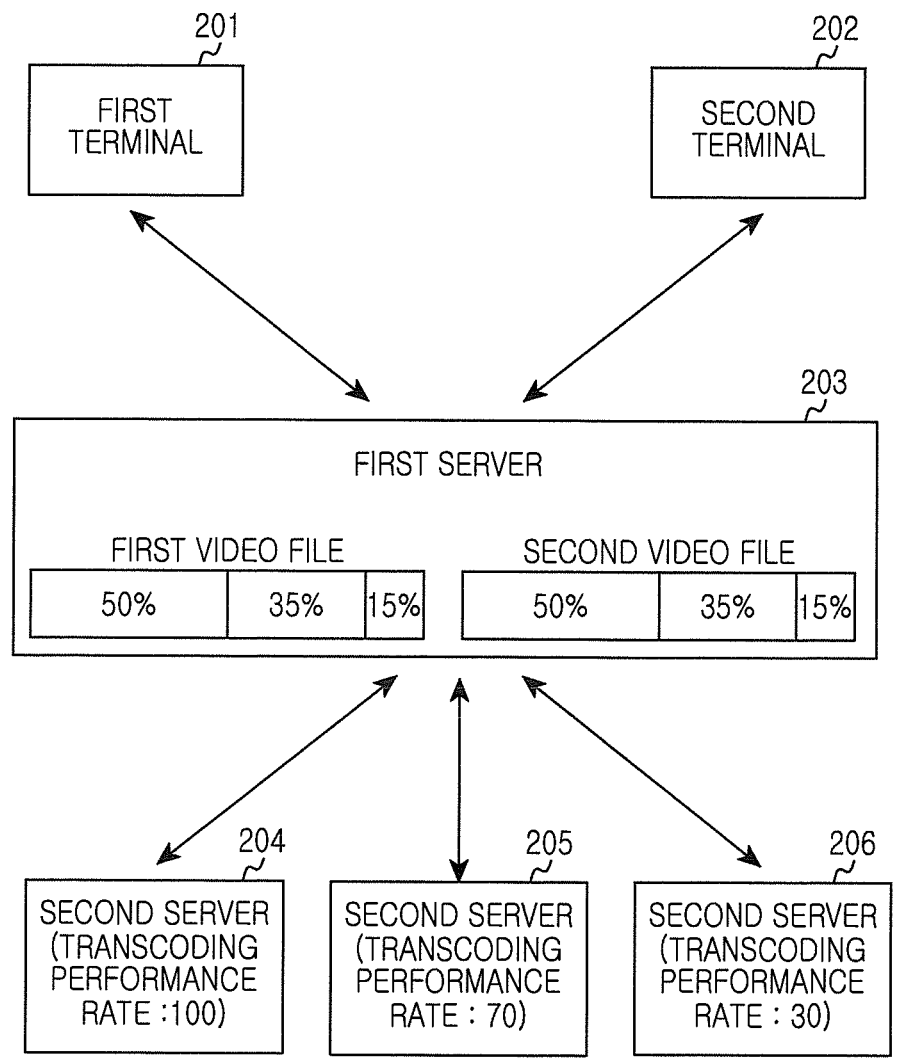
FIG. 2 illustrates an example distributed transcoding method using a plurality of servers according to an embodiment of the present invention.

FIG. 2 illustrates an example distributed transcoding method using multiple servers according to an embodiment of the present invention. As shown in FIG. 2, it is assumed that a first terminal 201 and a second terminal 202 request a first video file and a second video file from a first server 203, and the first server 203 requests transcoding from three second servers 204, 205, and 206. First, the first server 203 receives transcoding performance information from the three second servers 204, 205, and 206 at specified time intervals. The first server 203, receiving the transcoding performance information from the three second servers 204, 205, and 206, monitors their performance information and converts the performance to relative rates in the descending order of the performance based on the highest-performance server among the three second servers 204, 205, and 206. For example, the first server 203 ranks the three second servers 204, 205, and 206 in the order of the transcoding performance, and converts the performance of two remaining servers to the relative rates based on the server of the highest performance. That is, the transcoding performance is converted to the rate on the condition that the server of the highest performance is set to a value, such as 100. When the server of the highest performance is set to the value of 100, the server of the next highest performance is converted to the rate having a lower value of 70 and the server of the lowest performance is converted to the rate having an even lower value of 30. More specifically, when the transcoding performance rate of the server 204 having the highest performance is 100 among the three second servers 204, 205 and 206, the first server 203 converts the transcoding performance of the server 205 of the next highest performance to the rate of 70 and the transcoding performance of the server 206 having the lowest performance to the rate of 30.

Next, when the first terminal 201 requests a first video file from the first server 203, the first server 203 checks information associated with the first video file requested by the first terminal 201. Herein, the information associated with the video file indicates the format of the video file and can include, for example, the codec type, the screen size, and the bit rate. When the format of the first video file stored in the first server 203 is different from the format of the first terminal 201, the first server 203 commences the proxy transcoding to transmit the first video file to the first terminal 203. In more detail, the first server 203 segments the first video file requested by the first terminal 201 according to the transcoding performance rates of the three second servers 204, 205 and 206. For example, the first server 203 segments a particular video file requested by the first terminal 201 into three parts. That is, when the size of the first video file is set to a value, such as 100 by considering the transcoding performance of the three second servers 204, 205 and 206, the first server 203 segments the first video file to the size rates of 50%, 35% and 15%. Next, the first server 203 segmenting the video file to the three parts requests the transcoding of the segmented files to match the performances of the three second servers 204, 205 and 206. That is, the first server 203 requests the transcoding by sending the file of the size 50%, among the three segmented video files, to the second server 204 having the highest performance, requests the transcoding by sending the file of the size 35% to the next highest second server 205, and requests the transcoding by sending the file of the size 15% to the second server 206 having the lowest performance.

Next, it is assumed that the second terminal 202 requests a second video file from the first server 203 before the first server 203 receives the first video file transcoded from the three second servers 204, 205 and 206. When the second terminal 202 requests the second video file, the first server 203 checks the information associated with the second video file requested by the second terminal 202. When the format of the second video file stored in the first server 203 is different from the format of the second terminal 202, the first server 203 commences the proxy transcoding to transmit the second video file to the second terminal 202. In further detail, the first server 203 segments the second video file requested by the second terminal 202 according to the transcoding performance rates of the three second servers 204, 205 and 206. For example, the first server 203 segments a particular video file requested by the second terminal 202 into three parts. That is, when the size of the second video file is set to a value, such as 100 by considering the transcoding performance of the three second servers 204, 205 and 206, the first server 203 segments the second video file to the size rates of 50%, 35% and 15%, respectively.

Next, the first server 203 segmenting the second video file into the three parts requests the transcoding of the segmented files so as to match the performances of the three second servers 204, 205 and 206. That is, the first server 203 requests the transcoding by sending the file of the size 50%, among the three segmented video files, to the second server 204 having the highest performance, requests the transcoding by sending the file of the size of 35% to the next highest second server 205, and requests the transcoding by sending the file having the size of 15% to the second server 206 having the lowest performance. Thus, the first server requests the plurality of the transcoding operations from the at least two second severs so as to match their transcoding performance and thus fulfills the efficient offloading proxy operation.

Next, when the first server 203 receives the first video file and the second video file, which are completely transcoded, from the three second servers 204, 205 and 206 and forwards the files to the first terminal 201 and the second terminal 202 respectively, the distributed transcoding method using the multiple servers is finished.

Alternatively, the first server 203 requests the second server 204 of the highest performance to transcode the file of the size of 50%, of the three segmented video files requested by the first terminal 201, requests the next highest second server 205 to transcode the file of the size of 35%, and requests the second server 206 having the lowest performance to transcode the file of the size of 15%. Next, the first server 203 first receives the transcoded 50%-size file from the second server 204 of the highest performance and forwards the corresponding file to the first terminal 201. That is, the first server 203 sends the file which is transcoded first of all in the whole video file, to the first terminal 201 immediately, and sends the other untranscoded files to the first terminal 201 immediately when receiving them from the server 205 having the next highest performance and the server 206 having the lowest performance. Hence, when requesting a particular video file from the first server 203, the first terminal 201 can play the corresponding video file right away without time delay and allow the real-time streaming for playing the corresponding file before the entire video file is downloaded. Likewise, the first server 203 requests the second server 204 having the highest performance to transcode the part to play immediately in the entire video file requested by the terminal, and first transmits the transcoded file to the first terminal 201. That is, the first server 203 requests the server 204 having the highest performance among the second servers, to transcode the part to play immediately in the entire video file requested by the first terminal 201, and requests the servers 205 and 206 having the lower performance to transcode the part which does not need to be immediately played by the first terminal 201, thus achieving efficient distributed transcoding in some embodiments. The first server 203 requests the second server 204 having the highest performance to transcode the file of the size of 50%, of the three segmented video files requested by the second terminal 202, requests the next highest second server 205 to transcode the file having the size of 35%, and requests the second server 206 having the lowest performance to transcode the file having the size of 15%. Next, the first server 203 first receives the 50%-size file transcoded first from the second server 204 having the highest performance and forwards the corresponding file to the second terminal 202. That is, the first server 203 sends the file transcoded first in the entire video file, to the second terminal 20 immediately, and sends the other untranscoded files to the second terminal 202 immediately when receiving them from the server 205 having the next highest performance and the server 206 having the lowest performance. Hence, when requesting a particular video file from the first server 203, the second terminal 202 can play the corresponding video file immediately without time delay and allow the real-time streaming for playing the corresponding file even before the whole video file is downloaded. Likewise, the first server 203 requests the second server 204 having the highest performance to transcode the part to play immediately in the entire video file requested by the second terminal 202, and first transmits the transcoded file first to the second terminal 202. That is, the first server 203 requests the server 204 having the highest performance among the second servers, to transcode the part to play immediately in the entire video file requested by the second terminal 202, and requests the servers 205 and 206 having the lower performance to transcode the part which does not need to be immediately played by the second terminal 202, thus achieving efficient distributed transcoding in some embodiments.

Figure 3:
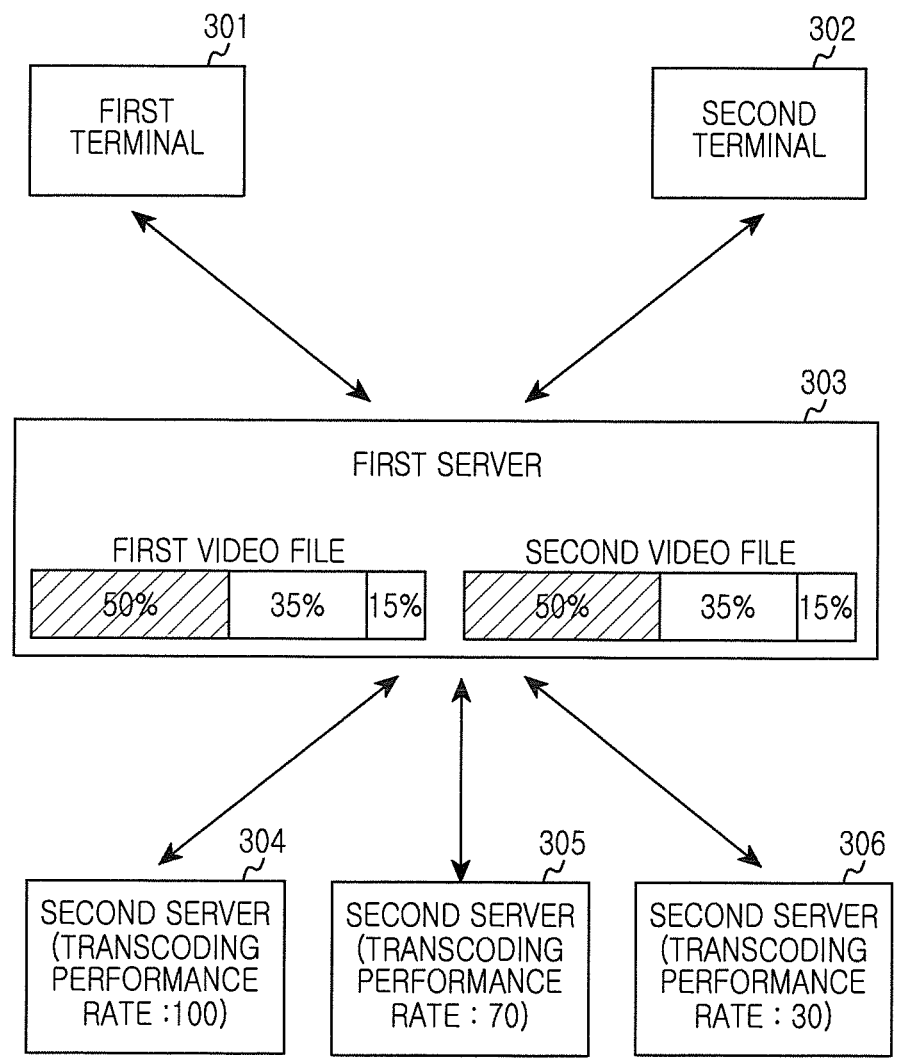
FIG. 3 illustrates another example distributed transcoding method using a plurality of servers according to an embodiment of the present invention.

FIG. 3 depicts another example distributed transcoding method using multiple servers according to an embodiment of the present invention. As shown in FIG. 3, it is assumed that a first terminal 301 and a second terminal 302 request only specific parts of a first video file and a second video file from a first server 303, and the first server 303 requests the transcoding from three second servers 304, 305, and 306. First, the first server 303 receives transcoding performance information from the three second servers 304, 305, and 306 at specified time intervals. The first server 303, receiving the transcoding performance information from the three second servers 304, 305, and 306, monitors and converts their performance information to the relative rates in descending order of performance based on the highest-performance server among the three second servers 304, 305, and 306. For example, the first server 303 ranks the three second servers 304, 305, and 306 in the order of the transcoding performance, and converts the performance of two remaining servers to the relative rates based on the server of the highest performance. That is, the transcoding performance is converted to the rate on the condition that the server having the highest performance is set to a value, such as 100. When the server of the highest performance is set to 100, the server of the next highest performance is converted to the rate of 70 and the server having the lowest performance is converted to the rate of 30. More specifically, when the transcoding performance rate of the server 304 having the highest performance is 100 among the three second servers 304, 305 and 306, the first server 303 converts the transcoding performance of the server 305 having the next highest performance to the rate of 70 and the transcoding performance of the server 306 having the lowest performance to the rate of 30.

Next, when the first terminal 301 requests only a particular part of the first video file from the first server 303, the first server 303 checks information associated with the first video file requested by the first terminal 301. When the format of the first video file stored to the first server 303 is different from the format of the first terminal 301, the first server 303 commences proxy transcoding to transmit the first video file to the first terminal 301. In more detail, the first server 303 segments the first video file requested by the first terminal 301 according to the transcoding performance rates of the three second servers 304, 305 and 306. For example, the first server 303 segments the particular video file requested by the first terminal 301 into two parts including a first region file and a second region file. That is, the first region file needs to be transmitted immediately from the first server 303 to the first terminal 301, and the second region file does not need to be transmitted right away to the first terminal 301. For example, when a user requests the first video file from the first server 303 and simultaneously inputs a command instructing the terminal to play from the particular part, to the first terminal 301, a part before the particular part of the first video file region becomes the first region file and another part after the particular part becomes the second region file. It is assumed that the first region file occupies 50% of the entire size of the first video file. That is, the 50%-sized first region which occupies the front portion of the first video file needs to be transmitted immediately from the first server 303 to the first terminal 301. Accordingly, the first server 303 requests the server 304 having the highest performance among the second servers, to transcode the first region file. At the same time, the first server 303 segments the second region file into the size rates of 35% and 15% according to the transcoding performance of the remaining second servers 305 and 306. The first server 303 segmenting the second region file into the two parts requests the transcoding by sending the file of the size of 35% to the next highest second server 305, and requests the transcoding by sending the file of the size of 15% to the second server 306 having the lowest performance.

Next, it is assumed that the second terminal 302 requests the second video file from the first server 303 before the first server 303 receives the transcoded first video file from the three second servers 304, 305 and 306. When the second terminal 302 requests the second video file, the first server 303 checks the information associated with the second video file requested by the second terminal 302. When the format of the second video file stored in the first server 303 is different from the format of the second terminal 302, the first server 303 commences proxy transcoding to transmit the second video file to the second terminal 302. In further detail, the first server 303 segments the second video file requested by the second terminal 302 according to the transcoding performance rate of the three second servers 304, 305 and 306. For example, the first server 303 segments the video file requested by the second terminal 302 into two parts including a first region file and a second region file. That is, the first region file needs to be transmitted immediately from the first server 303 to the second terminal 302, and the second region file does not need to be transmitted to the second terminal 302. For example, when the user requests the second video file from the first server 303 and simultaneously inputs a command instructing to play from a particular part to the second terminal 302, the part before the particular part of the second video file region becomes the first region file and the part after the particular part becomes the second region file. It is assumed that the first region file occupies 50% of the entire size of the second video file. That is, the 50%-sized first region which occupies the front portion of the second video file needs to be transmitted immediately from the first server 303 to the second terminal 302. Accordingly, the first server 303 requests the server 304 having the highest performance among the second servers, to transcode the second region file. At the same time, the first server 303 segments the second region file to the size rates of 35% and 15% according to the transcoding performance of the remaining second servers 305 and 306. The first server 303 segmenting the second region file into the two parts requests the transcoding by sending the file of the size of 35% to the next highest second server 305, and requests the transcoding by sending the file of the size of 15% to the second server 306 having the lowest performance. That is, the present invention divides the video file into the part requiring the immediate playback and the part requiring no immediate playback and requests the second server having the highest performance transcode the part requiring the immediate playback, to thus fulfill the efficient offloading, proxy operation. Next, when the first server 303 receives the first video file and the second video file, which are completely transcoded from the three second servers 304, 305 and 306 and forwards the files to the first terminal 301 and the second terminal 302 respectively, the distributed transcoding method using the multiple servers is finished.

Alternatively, the first server 303 requests the second server 304 having the highest performance to transcode the first region file to transmit immediately to the first terminal 301, of the three segmented video files requested by the first terminal 301, and requests the next highest second server 305 and the second server 306 having the lowest performance to transcode the second region file requiring no immediate transmission. Next, the first server 303 first receives the transcoded 50%-size file from the second server 304 having the highest performance and forwards the corresponding file to the first terminal 301. That is, the first server 303 sends the file which is transcoded first of all in the whole video file, to the first terminal 301 immediately, and sends the other untranscoded files to the first terminal 301 immediately when receiving them from the next highest server 305 and the server 306 having the lowest performance. Hence, when requesting the particular video file from the first server 303, the first terminal 301 can play the corresponding video file immediately without time delay and allow the real-time streaming for playing the corresponding file even before the whole video file is downloaded. Likewise, the first server 303 requests the second server 304 having the highest performance to transcode the part to play immediately in the whole video file requested by the first terminal 301, and first transmits the transcoded file to the first terminal 301. That is, the first server 303 requests the server 304 having the highest performance among the second servers, to transcode the part to play immediately in the whole video file requested by the first terminal 301, and requests the servers 305 and 306 having the lower performance to transcode the part which does not need to be immediately played by the first terminal 301, thus achieving the efficient distributed transcoding. The first server 303 requests the second server 304 having the highest performance to transcode the first region file requiring the immediate transmission to the second terminal 302, of the two segmented video files requested by the second terminal 302, and requests the next highest second server 305 and the second server 306 having the lowest performance to transcode the second region file requiring no immediate transmission. Next, the first server 303 first receives the transcoded 50%-size file from the second server 304 having the highest performance and forwards the corresponding file to the second terminal 302. That is, the first server 303 sends the file transcoded first in the whole video file, to the second terminal 302 immediately, and sends the other untranscoded files to the second terminal 302 immediately when receiving them from the server 305 having the next highest performance and the server 306 having the lowest performance. Hence, when requesting the particular video file from the first server 303, the second terminal 302 can play the corresponding video file immediately without time delay and allow the real-time streaming for playing the corresponding file even before the whole video file is downloaded. Likewise, the first server 303 requests the second server 304 having the highest performance to transcode the part to play immediately in the whole video file requested by the second terminal 302, and first transmits the transcoded file to the second terminal 302. That is, the first server 303 requests the server 304 having the highest performance among the second servers, to transcode the part to play immediately in the whole video file requested by the second terminal 302, and requests the servers 305 and 306 having the lower performance to transcode the part which does not need to be immediately played by the second terminal 302, thus achieving the efficient distributed transcoding.

Figure 4:
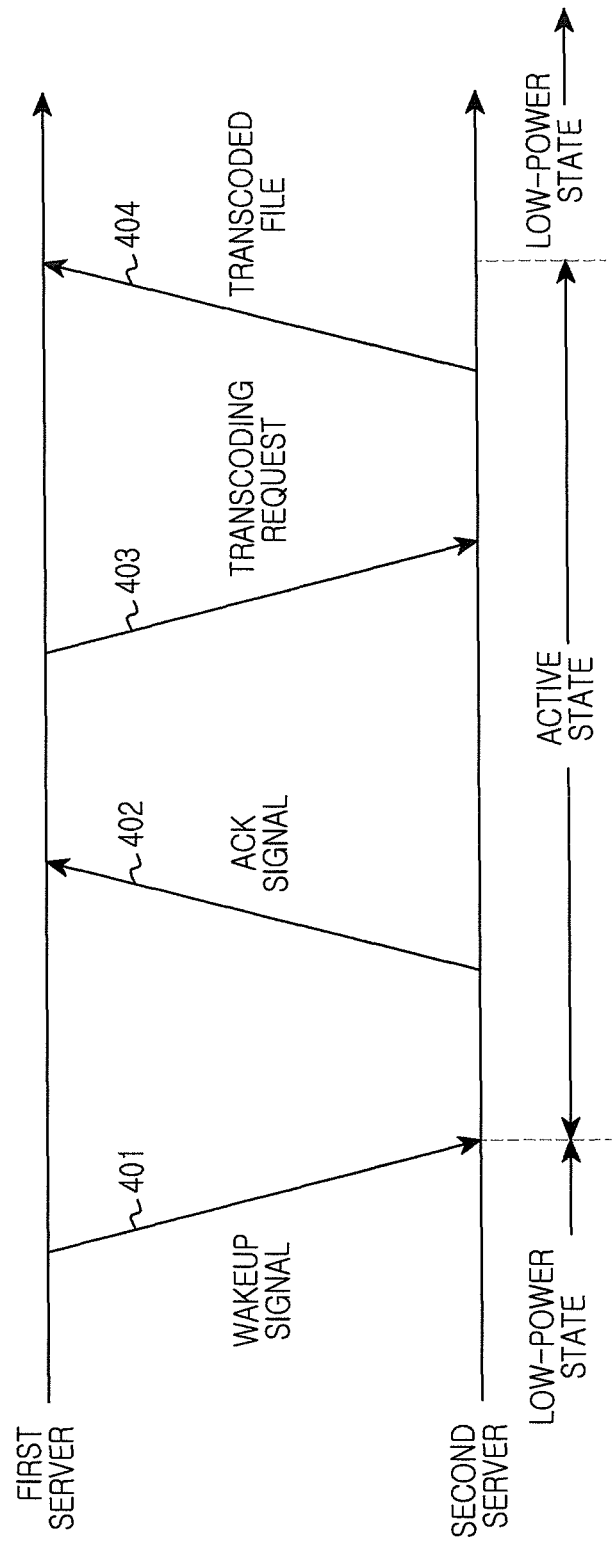
FIG. 4 illustrates an example power state change of a second server according to an embodiment of the present invention.

FIG. 4 depicts an example power state change of the second server according to an embodiment of the present invention. The second server proxies the transcoding as requested by the first server. That is, the second server may require considerable power to proxy the transcoding requested by the first server. It is more efficient for the second server to remain in a low-power state when it does not perform the transcoding. Thus, the present invention provides a method for regulating the power state of the second server based on the actual communication environment of the second server.

As shown in FIG. 4, the power state of the second server can be classified into a low-power state and an active state. The second server maintains the low-power state before proxying the transcoding requested from the first server. That is, when the second server does not proxy the transcoding of the first server, the low-power state is maintained in terms of the power reduction. The second server transmits the transcoding performance information to the first server at specified time intervals. Since the transmission of the transcoding performance information to the first server does not require much power, the transmission is feasible even in the low-power state. As stated above, when receiving a wakeup signal 401 from the first server in the low-power state, the second server switches its power state from the low-power state to the active state. Simultaneously, the second server sends an ACKnowledge (ACK) signal, as a response signal to the wakeup signal to the first server. That is, the first server receives the ACK signal from the second server and confirms that the second server is ready to proxy the transcoding. Next, the first server requests the second server to proxy the transcoding in step 403. In detail, the second server receives the wakeup signal 401 from the first server and concurrently switches its power state from the low-power state to the active state. Hence, as the transcoding is proxied, there is no lack of power. The second server which is requested by the first server to proxy the transcoding, upon completing the transcoding, transmits the transcoded file 404 to the first server. Concurrently, the second server switches its power state from the active state to the low-power state. Hence, since the power state of the second server is regulated based on the actual communication environment of the second server, the power can be efficiently used.

Figure 5:
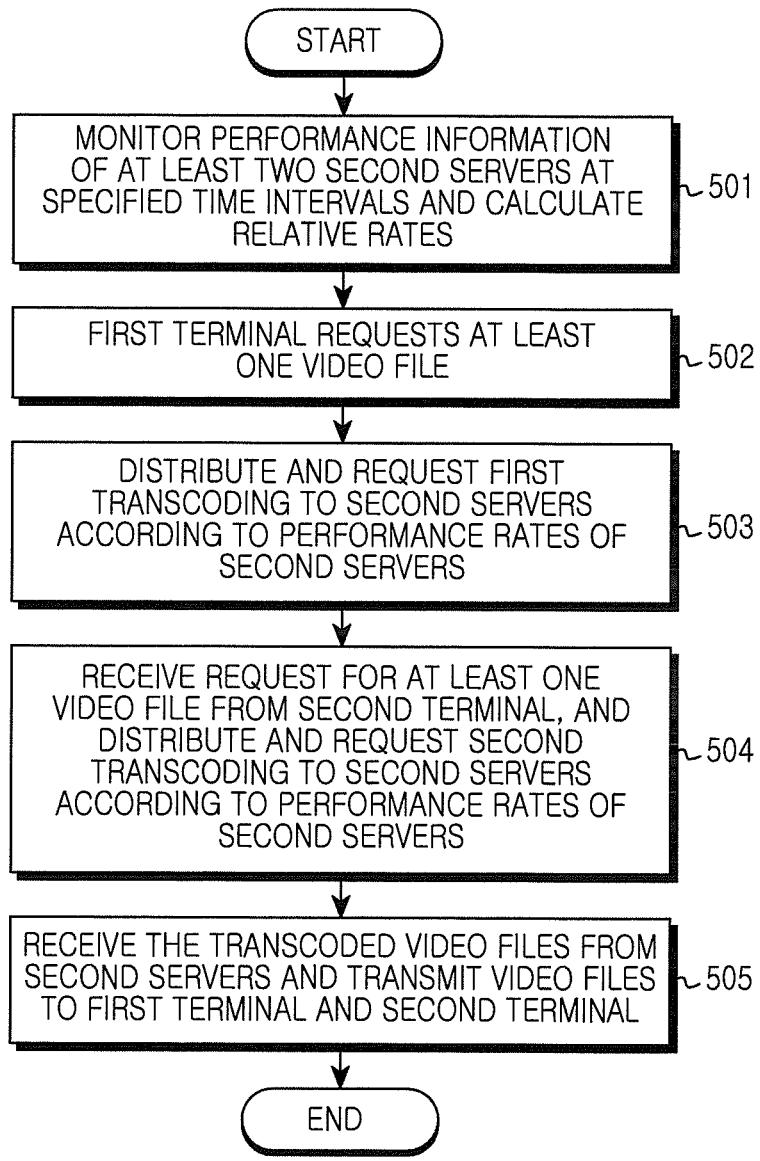
FIG. 5 illustrates an example operation of a first server according to an embodiment of the present invention.

FIG. 5 illustrates example operations of the first server according to an embodiment of the present invention. As shown in FIG. 5, the first server calculates the relative rates by monitoring the performance information of the at least two second servers at the specified time intervals in step 501. In detail, the first server receives the transcoding performance information from the second servers at the specified time intervals, and calculates the relative rates in the descending order of the performance based on the server having the highest performance among the second servers. That is, the first server obtains the transcoding performance of the second servers in real time and gets ready to request the proxy transcoding according to the performance of the second server when the multiple terminals request the transcoding.

In step 502, the first terminal requests at least one video file from the first server. More specifically, when the first terminal requests at least one video file from the first server, the first server confirms the information associated with the video file requested by the first terminal. Herein, the information associated with the video file indicates the format of the video file and can include, for example, the codec type, the screen size, and the bit rate. When the format of the video file stored in the first server is different from the format of the first terminal, the first server requires the transcoding to transmit the corresponding video file to the first terminal. The first server determining that the transcoding is necessary sends the wakeup signal to the second servers so as to switch the second servers from the low-power state to the active state. Next, upon receiving the ACK signals corresponding to the response of the wakeup signal from the second servers, the first server can confirm that the second servers can proxy the transcoding.

In step 503, the first server distributes and requests the first transcoding to the second servers according to the performance rates of the second servers. For example, it is assumed that the first server is coupled with three second servers, and when the server having the highest performance among the three second servers is set to a value, such as 100, the performance rate of the next highest server is converted to 70 and the performance rate of the server having the lowest performance is converted to 30. The first server segments a particular video file requested by the first terminal into three parts. That is, assuming the size of the video file as 100, the first server segments the file into the size rates of 50%, 35%, and 15% according to the transcoding performance of the three second severs. The first server segmenting the video file into the three parts requests the transcoding of the segmented files from the three second servers to match their performance. That is, the first server requests the transcoding by sending the file of the size of 50%, among the three segmented video files, to the second server having the highest performance, requests the transcoding by sending the file of the size of 35% to the next highest second server, and requests the transcoding by sending the file of the size of 15% to the second server having the lowest performance.

In step 504, the second terminal requests at least one video file from the first server, and the first server segments the video file according to the performance rates of the second servers and requests the second transcoding from the second servers. It is assumed that the second terminal requests at least one video file from the first server before the first server receives the transcoded video file from the second servers. Upon receiving the video file request from the second terminal, the first server confirms the information associated with the second video file requested by the second terminal. When the format of the video file stored to the first server is different from the format of the second terminal, the first server commences the proxy transcoding in order to transmit the video file to the second terminal. In step 503, the first server segments the video file requested by the second terminal based on the transcoding performance rates of the three second servers. That is, assuming the size of the video file as 100, the first server segments the file into the size rates of 50%, 35%, and 15% according to the transcoding performance of the three second severs. Next, the first server segmenting the video file into the three parts requests the transcoding of the segmented files from the three second servers to match their performance. That is, the first server requests the transcoding by sending the file of the size of 50%, in the three segmented video files, to the second server having the highest performance, requests the transcoding by sending the file of the size of 35% to the next highest second server, and requests the transcoding by sending the file of the size of 15% to the second server having the lowest performance. Thus, the first server can fulfill the efficient offloading proxy operation by requesting the transcoding operations from the at least two second servers to match their transcoding performance.

In step 505, the first server receives the transcoded video files from the second servers and transmits the video files to the first terminal and the second terminal respectively. Hence, the first terminal and the second terminal can receive and play the video file in their native format. As such, since the transcoding performance of the second server is considered, the transcoding can be effectively distributed. In step 505, while the first server can receive the transcoded video files from the second servers and transmit the video files to the first terminal and the second terminal respectively, the first server may transmit only the transcoded part of the video file to the first terminal and the second terminal. In more detail, the first server may transmit the part transcoded first of the video file to the first terminal immediately, and transmit the untranscoded parts to the first terminal and the second terminal the instant they are received from the next highest server and the lowest server. Thus, when requesting the particular video files from the first server, the first terminal and the second terminal can play the corresponding video file without time delay and allow the real-time streaming for playing the corresponding file even before the whole video file is downloaded. Likewise, the first server requests the second server having the highest performance to transcode the part to play immediately in the whole video file requested by the terminal, and first transmits the transcoded file part to the terminal. That is, the first server requests the server having the highest performance among the second servers, to transcode the part to play immediately in the whole video file requested by the terminal, and request the servers having the lower performance to transcode the part which does not need to be immediately played by the terminal, thus achieving the efficient distributed transcoding.

Figure 6:
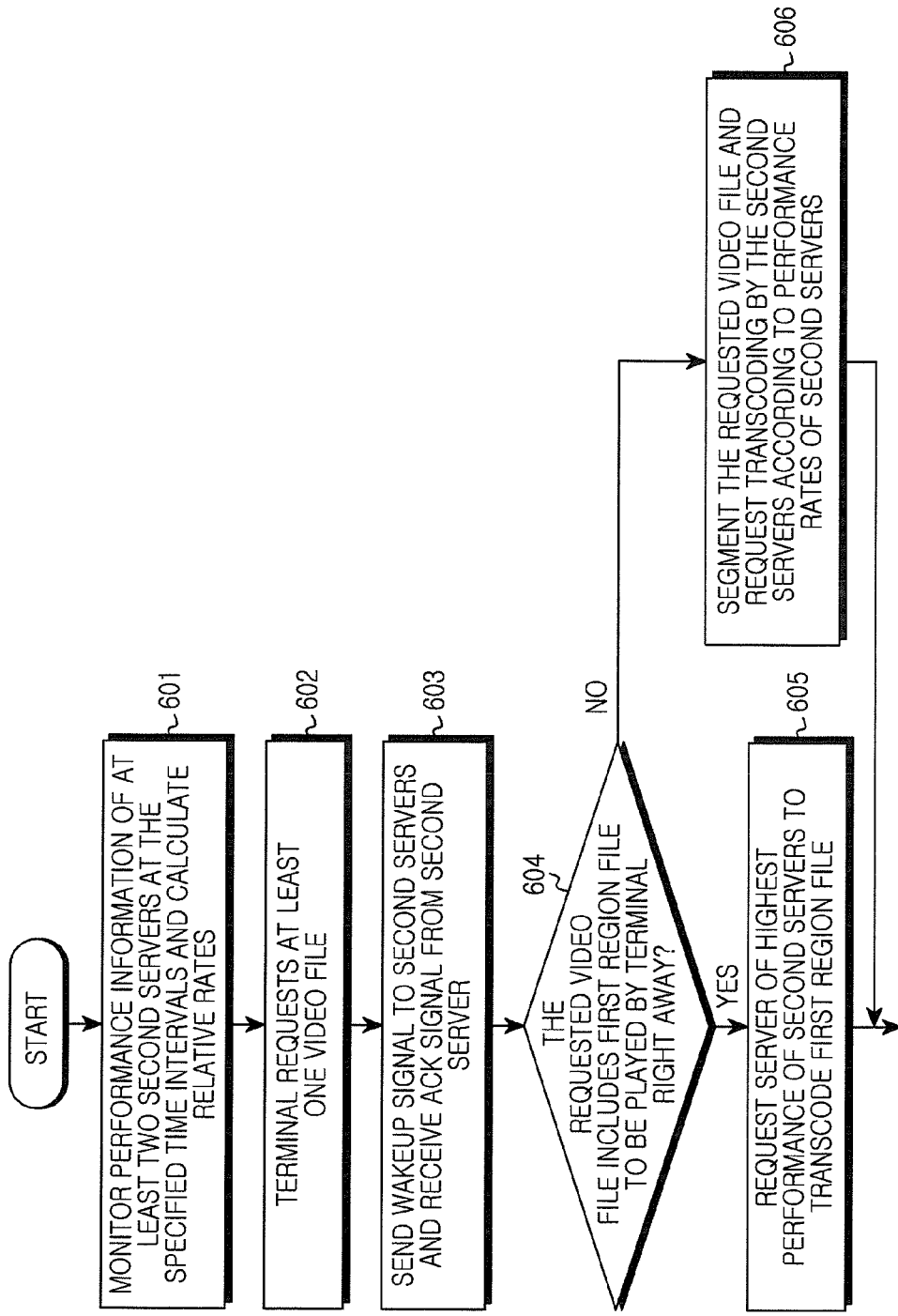
FIG. 6 illustrates another example operation of the first server according to an embodiment of the present invention.

FIG. 6 illustrates example operations of the first server according to an embodiment of the present invention. The first server monitors the performance information of the at least two second servers at the specified time intervals and convert the performance to the relative rates in step 601. In detail, the first server receives the transcoding performance information from the second servers at the specified time intervals, and calculates the relative rates in the descending order of the performance based on the server having the highest performance among the second servers. That is, the first server obtains the transcoding performance of the second servers in real time and gets ready to request the proxy transcoding according to the performance of the second servers when the multiple terminals requests the transcoding.

In step 602, the terminal requests at least one video file from the first server. More specifically, when the terminal requests at least one video file from the first server, the first server confirms the information associated with the video file requested by the terminal. Herein, the information associated with the video file indicates the format of the video file and can include, for example, the codec type, the screen size, and the bit rate. When the format of the video file stored in the first server is different from the format native to the terminal, the first server requests the transcoding to transmit the corresponding video file to the terminal.

In step 603, the first server sends the wakeup signal to the second servers and receives the ACK signals from the second servers. In detail, the first server determining that the transcoding is necessary sends the wakeup signal to the second servers so as to switch the second server from the low-power state to the active state. Next, upon receiving the ACK signals corresponding to the response of the wakeup signal from the second servers, the first server can confirm that the second servers can proxy the transcoding.

In step 604, the first server determines whether the video file requested by the terminal includes the first region file to be played by the terminal immediately. Herein, the first region file needs to be transmitted immediately from the first server to the terminal, and the second region file does not need to be transmitted to the terminal. For example, when the user requests the video file from the first server and simultaneously inputs the command instructing to play from a particular part to the terminal, the part before the particular part of the video file region becomes the first region file and the part after the particular part becomes the second region file. Namely, the first server determines whether the video file requested by the terminal includes the first region file. Upon determining the first region file, the first server requests the transcoding from the second server having the highest performance among the second servers.

When determining that the video file requested by the terminal includes the first region file to be played by the terminal immediately in step 604, the first server requests the server having the highest performance of the second servers to transcode the first region file in step 605. More specifically, as the first region file needs to be played by the terminal immediately, the first server requests the server having the highest performance of the second servers to transcode the first region file to transmit only the first region file transcoded to the terminal. Provided that the first region file occupies 50% of the entire size of the video file, the first server segments the particular video file requested by the terminal into two parts including the first region file and the second region file. That is, the 50%-sized first region which occupies the front portion of the video file needs to be transmitted immediately from the first server to the terminal. Accordingly, the first server requests the server having the highest performance among the second servers, to transcode the second region file. Concurrently, the first server requests the two other servers excluding the server having the highest performance among the second servers, to transcode the second region file.

When determining that the video file requested by the terminal does not include the first region file to be played by the terminal right away, the first server segments the video file requested by the terminal and requests the transcoding from the second servers according to the performance rates of the second servers in step 606. For example, it is assumed that the first server is coupled with three second servers, and when the server having the highest performance among the three second servers is set to a value, such as 100, the performance rate of the next highest server is converted to 70 and the performance rate of the server of the lowest performance is converted to 30. The first server segments a particular video file requested by the first terminal into three parts. That is, assuming the size of the video file as 100, the first server segments the file into the size rates of 50%, 35%, and 15% according to the transcoding performance of the three second severs. The first server segmenting the video file into the three parts requests the transcoding of the segmented files from the three second servers to match their performance. That is, the first server requests the transcoding by sending the file having the size of 50%, among the three segmented video files, to the second server having the highest performance, requests the transcoding by sending the file having the size of 35% to the next highest second server, and requests the transcoding by sending the file having the size of 15% to the second server having the lowest performance.

Figure 7:
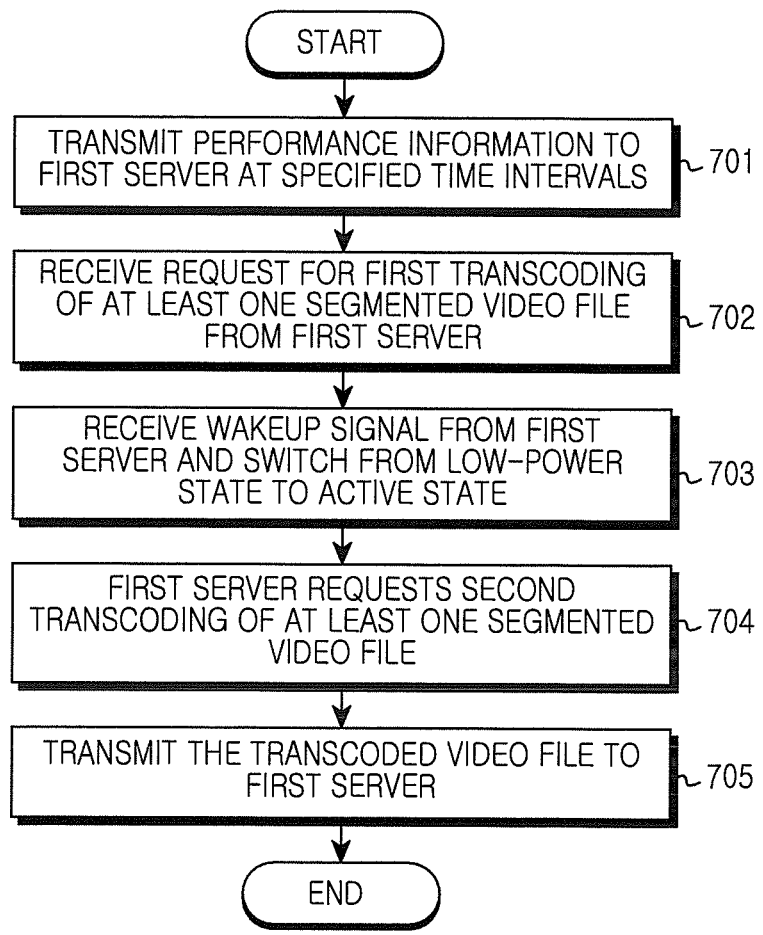
FIG. 7 illustrates an example operation of the second server according to an embodiment of the present invention.

FIG. 7 illustrates example operations of the second server according to an embodiment of the present invention. As shown in FIG. 7, the second server transmits its performance information to the first server at the specified time intervals in step 701. The at least two second servers transmit their transcoding performance information to the first server at the specified time intervals so that the first server can obtain the performance information of the second servers and distribute the transcoding based on their performance.

In step 702, the first server requests the first transcoding of the at least one segmented video file from the second server. More specifically, the first server requests the first transcoding proxy operation from the at least two second servers in proportion to their transcoding performance. That is, the server having the highest transcoding performance among the second servers is requested to proxy the first transcoding of the greater part of one video file in proportion to its transcoding performance. Likewise, the server having the lower transcoding performance among the second servers is requested to proxy the first transcoding of the smaller part of one video file.

In step 703, the second server receives the wakeup signal from the first server and switches from the low-power state to the active state. The power state of the second server can be delineated into the low-power state and the active state. Before proxying the transcoding as requested by the first server, the second server is maintained in the low-power state. That is, when the second server does not proxy the transcoding of the first server, it stays in the low-power state in view of the power reduction. The second server transmits its transcoding performance information to the first server at the specified time intervals. Since the transmission of the transcoding performance information to the first server does not require much power, the transmission is feasible even in the low-power state. Upon receiving the wakeup signal from the first server in the low-power state, the second server switches its power state from the low-power state to the active state. Simultaneously, the second server sends the ACK signal, as a response signal of the wakeup signal to the first server. That is, the second server sends the ACK signal to the first server to inform that that the second server is ready to proxy the transcoding.

In step 704, the first server requests the second transcoding of at least one segmented video file from the second server which is proxying the first transcoding. Specifically, the first server requests the at least two second servers to proxy the second transcoding in proportion to their transcoding, performance. That is, the server having the highest transcoding performance among the second servers is requested to proxy the second transcoding of the greater part of one video file in proportion to its transcoding performance. Likewise, the server having the lower transcoding performance among the second servers is requested to proxy the second transcoding of the smaller part of one video file.

In step 705, the second server transmits the transcoded video file to the first server. While the servers functioning as the second servers proxy the transcoding in the conventional method, the conventional method does not take into account the transcoding performance of the server which proxies the transcoding. That is, the conventional method performs the monolithic proxy transcoding and thus does not reflect the actual communication environment. However, embodiments of the present invention considers the transcoding performance of the second servers and thus can effectively distribute the transcoding. In step 705, while the second server can transmit the transcoded video files to the first server, the second server may transmit only the transcoded part of the video file to the first server. Hence, the first terminal and the second terminal can play the corresponding, video file without time delay and allow the real-time streaming for playing the corresponding file even before the whole video file is downloaded.

Figure 8:
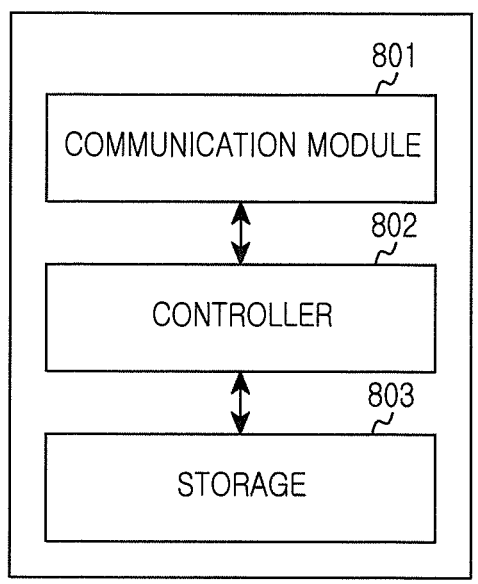
FIG. 8 illustrates an example first server according to an embodiment of the present invention.

FIG. 8 illustrates an example first server according to an embodiment of the present invention. As shown in FIG. 8, the first server can include a communication module 801, a controller 802, and a storage 803.

The communication module 801 processes signals transmitted and received via an antenna for voice and data communication. For example, the communication module 801 receives the first video file request from the first terminal, distributes and requests the first transcoding of the first video file to the at least two servers according to the performance rates of the second servers, receives the second video file request from the second terminal before receiving the first video file transcoded from the second servers, and distributes and requests the second transcoding of the second video file to the second servers according to the performance rates of the second servers. The communication module 801 requests the second transcoding of the second video file of the relatively greater size from the server having the higher performance among the second servers, and requests the second transcoding of the second video file of the relatively smaller size from the server having the lower performance. The communication module 801 requests the second transcoding of the second video file from the server having the highest performance among the second servers, sends the wakeup signal to the at least two second servers, and receives the ACK signals from the second servers. The communication module 801 transmits the segmented first video file to the second server to match the performance rate of the second server, transmits the first region file to the server having the highest performance among the second servers, transmits the second region file segmented to the other servers to match the performance rates of the other servers, and transmits the second region file segmented to the second server to match the performance rate of the second server. The communication module 801 transmits the first region file to the server having the highest performance among the second servers, transmits the second region file segmented to the other servers to match the performance rates of the other servers, receives the video files of the first transcoding and the second transcoding completed from the second server, and transmits the video files of the first transcoding and the second transcoding completed to the first terminal and the second terminal.

The controller 802 controls the operations of the first server. For example, the controller 802 segments the first video file based on the performance rates of the second servers for the sake of the first transcoding, segments the first video file to the first region file and the second region file for the first transcoding, and segments the second region file according to the performance rates of the other servers excluding the server having the highest performance among the second servers. The controller 802 confirms the information associated with the second video file requested by the second terminal, confirms that the format of the requested second video file is different from the format of the stored video file, segments the second video file based on the performance rates of the second servers for the second transcoding, segments the second video file into the first region file and the second region file for the second transcoding, and segments the second region file according to the performance rates of the other servers excluding the server of the highest performance among the second servers.

The storage 803 is configured to store a program to control the operations of the first server, and data generating during the program execution.

As constructed above, the controller 802 can control the functions of the first server. The components are separately provided to distinguish their functions. Accordingly, in the actual product, the controller 802 may process all or part of the functions of the first server.

Figure 9:
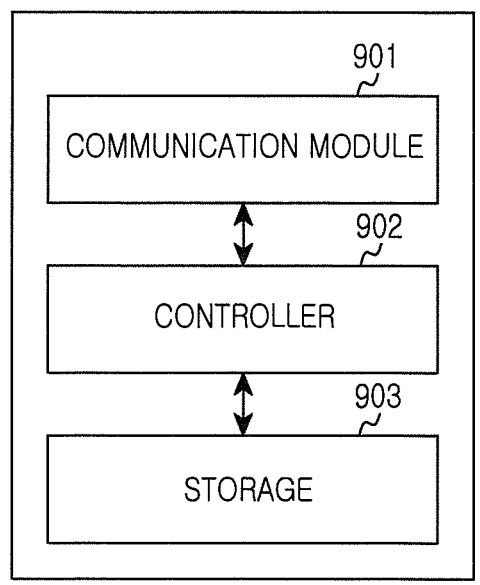
FIG. 9 illustrates an example second server according to an embodiment of the present invention.

FIG. 9 illustrates an example second server according to an embodiment of the present invention. As shown in FIG. 9, the second server can include a communication module 901, a controller 902, and a storage 903.

The communication module 901 processes signals transmitted and received via an antenna for voice and data communication. For example, the communication module 901 receives the first transcoding request of the at least one segmented video file from the first server, and receives the second transcoding request of the at least one segmented video file from the first server in the process of the first transcoding. The communication module 901 transmits the performance information to the first server at the specified time intervals, receives the wakeup signal from the first server, sends the ACK signal to the first server, and transmits the transcoded video file to the first server.

The controller 902 controls the operations of the second server. For example, the controller 902 switches from the low-power state to the active state, and completes the first transcoding and the second transcoding, and switches from the active state to the low-power state.

The storage 903 is configured to store a program to control the operations of the second server, and a data generated during the program execution.

As constructed above, the controller 902 can control the functions of the second server. The components are separately provided to distinguish their functions. Accordingly, in the actual product, the controller 902 may process all or part of the functions of the second server.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of a first server, the method comprising:
   receiving a request for a video file from a first terminal;
   segmenting the video file based on a play time of at least a portion of the video file and a performance rate of a plurality of second servers;
   transmitting the segmented video file for transcoding to the plurality of second servers, wherein transmitting the segmented video file comprises:
   transmitting the segmented video file of a greater size to a second server having a higher performance among the plurality of second servers; and
   transmitting the segmented video file having a smaller size to other server having a lower performance among the plurality of second servers;

receiving, at the first server, a transcoded video file from the plurality of second servers; and transmitting, by the first server, the transcoded video file to the first terminal.

2. The method of claim 1, wherein transmitting the segmented video file comprises:

transmitting the segmented video file to the second server having the highest performance among the plurality of second servers.

3. The method of claim 1, further comprising:

before receiving the request for the video file, sending a wakeup signal to the plurality of second servers; and receiving an ACKnowledge (ACK) signal from the plurality of second servers.

4. The method of claim 1, wherein segmenting the video file further comprises:

segmenting the video file to a first region file and a second region file based on the play time of at least the portion of the video file and the performance rate of the plurality of second servers, and wherein transmitting the segmented video file comprises:

transmitting the first region file to the second server having the highest performance among the plurality of second servers;

segmenting the second region file according to the performance rate of other servers excluding the second server having the highest performance among the plurality of second servers; and transmitting the segmented second region file to the other servers to match the performance rates of the other servers.

5. The method of claim 1, wherein receiving the request for the video file from the first terminal comprises:

identifying information associated with the requested video file; and identifying that a format of the requested video file is different from a format of a stored video file.

6. The method of claim 4, wherein the first region file comprises a file region, in the video file, which needs to be played immediately by the first terminal.

7. The method of claim 1, wherein the performance comprises a transcoding performance.

8. A first server comprising:

a communication interface; and a controller configured to:

receive a request for a video file from a first terminal through the communication interface;

segment the video file based on a play time of at least a portion of the video file and a performance rate of a plurality of second servers;

control the communication interface to transmit the segmented video file for transcoding to the plurality of second servers, wherein transmitting the segmented video file comprises:

transmitting the segmented video file of a greater size to a second server having a higher performance among the plurality of second servers; and transmitting the segmented video file having a smaller size to other server having a lower performance among the plurality of second servers;

receive, at the first server, a transcoded video file from the plurality of second servers through the communication interface; and control the communication interface, by the first server, to transmit the transcoded video file to the first terminal.

9. The first server of claim 8, wherein the controller is configured to control the communication interface to transmit the segmented video file to the second server having a highest performance among the plurality of second servers.

10. The first server of claim 8, wherein the controller is configured to control the communication interface to send a wakeup signal to the at least two second servers, and receive an ACKnowledge (ACK) signal from the plurality of second servers through the communication interface.

11. The first server of claim 8, wherein the controller is configured to:

segment the video file to a first region file and a second region file based on the play time of at least the portion of the video file and the performance rate of the plurality of second servers; and segment the second region file according to the performance rates of other servers excluding the second server having the highest performance among the plurality of second servers, and wherein the communication interface is configured to:

transmit the first region file to the server having the highest performance among the plurality of second servers; and transmit the segmented second region file to the other servers to match the performance rates of the other servers among the plurality of second servers.

12. The first server of claim 11, wherein the first region file comprises a file region in the video file, wherein the file region is played immediately by the first terminal.

13. The first server of claim 8, wherein the controller is configured to:

identify information associated with the video file requested by the first terminal; and identify that a format of the requested video file is different from a format of a stored video file.

14. The first server of claim 8, wherein the performance comprises a transcoding performance.

* * * * *